Jan. 29, 1929.
C. M. POND
1,700,333
CUTTER LOCKING MEANS FOR MILLING TOOLS
Filed Feb. 18, 1925
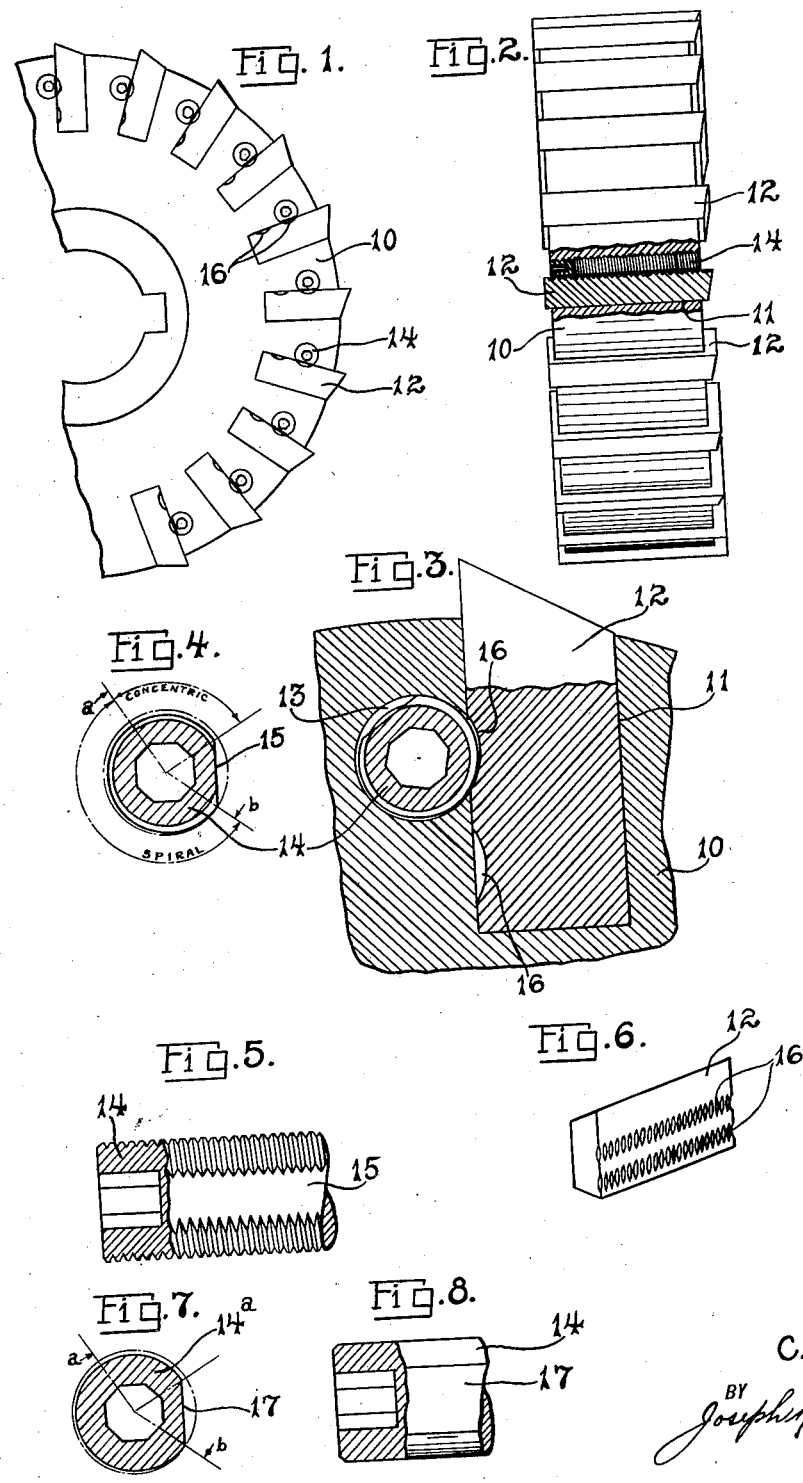

Patented Jan. 29, 1929.

1,700,333

UNITED STATES PATENT OFFICE.

CHARLES M. POND, OF HARTFORD, CONNECTICUT, ASSIGNOR TO PRATT & WHITNEY COMPANY, OF NEW YORK, N. Y., A CORPORATION OF NEW JERSEY.

CUTTER-LOCKING MEANS FOR MILLING TOOLS.

Application filed February 18, 1925. Serial No. 10,091.

This invention relates to cutting tools and in particular to a rotatable cutting tool comprising a body portion and a plurality of inserted cutters or teeth.

It is an object of the present invention to provide improved locking means for securing the blades or cutters in position within recesses or slots formed in the body member of a cutting tool.

Another object of the invention is to provide improved locking means for the cutters within the body members which will enable the cutters to be uniformly adjusted spaced distances to compensate for their being worn away during the cutting operations to permit additional use of the cutters.

Another object of the invention is to provide locking means for the cutters in the form of individual screws or other rotatable members for each of the cutters, the cross sectional form of the members being non-circular so that by rotation the peripheral portions of the members may contact with the cutters and securely clamp them within their respective recesses.

Another object of the invention is to provide locking means for inserted cutters of a cutting tool adapted to engage notches formed in a surface of the cutters, one or more of these series of notches being provided either one of which may be engaged by the locking means.

With these and other objects in view, my invention consists in the features of construction and operation set forth in the following specification and illustrated in the accompanying drawing.

In the accompanying drawing annexed hereto and forming a part of this specification, I have shown my invention embodied in a form of inserted cutter milling tool, but it will be understood that the invention can be otherwise embodied and that the drawing is not to be construed as defining or limiting the scope of the invention, the claims appended to this specification being relied upon for that purpose.

In the drawing:

Figure 1 is a front view of a portion of a cutting tool made in accordance with the present invention.

Fig. 2 is an end view of the same, a part thereof being broken away to show the cutter securing means in operative position.

Fig. 3 is an enlarged cross sectional view showing a portion of the body member with the cutter and securing member in engagement therewith.

Fig. 4 is a separate cross sectional view of the locking screw.

Fig. 5 is a longitudinal view of the locking screw, part being shown in section thereof.

Fig. 6 is an isometric view of a cutting blade showing the notches therein adapted to engage the locking member.

Fig. 7 is an end view of a modified form of locking member, and

Fig. 8 is a longitudinal view of the same.

In the above mentioned drawing, I have shown but one embodiment of the invention which is now deemed preferable, but it is to be understood that changes and modifications may be made within the scope of the appended claims without departing from the spirit of the invention.

Briefly and in its broadest aspect, my invention comprises the following principal parts: First, a body member provided with a plurality of recesses or grooves cut into its periphery; second, cutters or blades adapted to be inserted therein and provided in the preferred embodiment of the invention with slight notches along one of its faces, and third, locking screws adapted to be threaded into threaded holes within the body member adjacent and extending partly within the recesses so that the threaded portion of the screws may enter the notches formed in the cutters.

Referring more in detail to the figures of the drawing, I provide a body member 10 for the rotatable cutting tool, which, as shown, may comprise a circular disc having spaced recesses 11 cut into its periphery. Cutters 12 or teeth closely fitting these recesses are provided which may have their cutting surfaces upon the outer periphery or side edges. It will be understood, however, that the particular form of the cutting surfaces constitutes no part of the present invention, the one illustrated in the drawing being merely representative. The cutting surfaces provided on the cutters or teeth 12 may be designed for the particular type of cutting operations to be performed.

Extending parallelly with the axis of rotation of the body member 10 and adjacent one of the walls of each of the recesses are tapped holes 13 extending preferably entirely through the body member 10. Insertable within these tapped holes are screws 14, shown more in detail in Figs. 4 and 5. These tapped holes, as will be seen in Fig. 3, intercept the recesses for the cutters. This permits the threaded portions of the screws to extend into the recesses when turned to their clamping positions.

As shown in these figures, the cross sectional form of this locking screw 14 is not exactly circular, but for a portion of its periphery, as between points "a" and "b" the diameter very slightly increases. In the specific form of screw 14 shown in Figs. 4 and 5, the threaded periphery of the screw is circular for approximately 90° as indicated by the arrows and from that point to the opposite end of the threaded portions the diameter is slightly increased. Also, as shown, one side of the screw is flattened as at 15 so that the blades or cutters 12 may readily be inserted in their recesses 11 with the screw 14 threaded in position.

On the front surface of each of the cutters or blades 12 are provided slight notches 16, these corresponding in spacing to the convolutions of the thread on the locking screw 14 and these notches or depressions 16 are adapted to be engaged by the threaded portions of the screw 14 when the screw is in its locking position.

In using the improved form of locking means, the screws 14 may each be threaded into a body member 10 and retained indefinitely therein while the cutters 12 may be removed and others substituted, or the cutters 12 may be adjusted axially or radially as they are worn away during the cutting operations. With the screw 14 positioned so that its cutaway side is toward and parallel to the end wall of the recess 11, the cutters 12 may be freely inserted in the recess and, by rotating the locking screw 14, the threaded portions thereon enter the notches 16 provided in the cutters 12. As the screw 14 is continued to be rotated, the slight increase in diameter causes the threads to enter the notches 16 so that the cutters 12 are securely held within their recesses 11 against axial or outward movement. Also, as the threaded portions of the screws 14 enter the notches 16 in the cutters 12, the cutters 12 are positively held in their adjusted position.

Preferably and as shown in Fig. 3, the notches 16 in the cutters 12 have their centers slightly nearer the periphery of the body members 10 than the center for the threaded hole 13 in which the locking screw 14 is retained. The threaded portions of the screw 14 therefore bear upon the lower portions of the notches 16 and tend to draw the cutters 12 down toward the bottom of the recess during the clamping operation.

In order to easily rotate the screws 14 one end is provided with a recess preferably of hexagonal form as shown in Figs. 3 and 4. Within these recesses a small wrench or lever (not shown) may be inserted.

It may be desirable in certain instances to have two adjacent series of notches 16 cut into the cutters 12 so that as portions of the cutters 12 are worn away the cutters may be adjusted radially outward until the second row of notches are in position to be engaged by the locking screw. This arrangement is shown clearly in Fig. 6.

In Figs. 7 and 8 a modification is shown in which the locking member 14$^a$ for the cutters 12 is not threaded. As shown in Fig. 7, the cross section is not circular. A portion of the periphery between "a" and "b" is slightly spiral, increasing slightly in diameter from the point "a" to "b". In use this locking member 14$^a$ is positioned in a plain drilled hole adjacent and connected with each of the recesses 11. Rotating this locking member 14$^a$ causes the spiral portion of the periphery to securely bind the cutter 12 within the recess 11. Also as shown in Figs. 7 and 8, the member 14$^a$ is provided with a flattened side 17 permitting the cutters 12 to be inserted freely with the locking member 14$^a$ in one rotative position. In this form of the invention the face of the cutter 12 is not notched as shown in Fig. 6, but is left smooth. The engagement of the locking member 14$^a$ with the cutter 12 is therefore a frictional one and the cutters 12 may be adjusted lengthwise any distances desired.

What I claim is:

1. A cutting tool comprising in combination, a cylindrical body member, a plurality of cutters inserted in the periphery thereof, and rotary locking members for each of said cutters, said members being rotatable into and out of locking engagement with the cutters, each of said members extending transversely within the body member throughout the width of said body member and having its side portions contacting with the forward surface of one of the cutters.

2. A cutting tool comprising in combination, a body member, a plurality of cutters inserted therein, and threaded locking members for each of said cutters, each of said members extending transversely within the body member throughout the width of said body member and having its threaded portion contacting with notches formed along the cutter in the forward surface of one of the cutters.

3. A cutting tool comprising in combination, a cylindrical body member, a plurality of cutters inserted in the periphery thereof, and rotary locking members for said cutters extending substantially throughout the length of said cutters, each of said members extending adjacent a surface of the cutters and having an eccentric surface adapted upon rotation of the member to engage and clamp the cutter in position.

4. A cutting tool comprising in combination, a cylindrical body member, a plurality of cutters inserted in the periphery thereof, and threaded locking members for each of said cutters, each of said members extending adjacent a surface of each of the cutters and having an eccentric threaded portion upon its periphery adapted upon rotation of the member to positively engage and clamp the cutter in position.

5. A cutting tool comprising in combination, a cylindrical body member, a plurality of cutters inserted in the periphery thereof, and rotary locking members for each of said cutters, said locking members adapted to contact with said cutters substantially throughout their length and comprising screws of non-circular cross section whereby rotation thereof is adapted to clamp said cutters in position.

6. A cutting tool comprising in combination, a cylindrical body member, a plurality of cutters inserted in the periphery thereof, said cutters each being provided throughout its length with spaced notches extending transversely of the cutters on one of its surfaces, and rotary locking members for each of said cutters, said members adapted to contact with said notches in said cutters and comprising screws of non-circular cross section whereby rotation thereof is adapted to clamp said cutters in position.

7. A cutting tool comprising in combination, a cylindrical body member, a plurality of cutters inserted in the periphery thereof, and rotary locking members for each of said cutters, said members comprising screws threaded into said body member in a direction parallel to the axis of rotation of the body member adjacent said cutter and having portions adapted to contact with said cutter, said screws upon rotation being adapted to clamp said cutter in position.

8. A cutting tool comprising in combination, a cylindrical body member, a plurality of cutters inserted in the periphery thereof provided with a series of spaced notches in one of their surfaces extending substantially throughout their length, and rotary locking members for each of said cutters, said members comprising screws threaded into said body member adjacent said cutters in a direction parallel to the axis of rotation of said body member and having portions adapted to contact with said notches in said cutters whereby said locking member may engage said notches in different axial positions of the cutter and clamp said cutters in adjusted position.

In testimony whereof, I hereto affix my signature.

CHAS. M. POND.